(12) United States Patent
Richter et al.

(10) Patent No.: US 6,515,097 B2
(45) Date of Patent: Feb. 4, 2003

(54) BLOCKED POLYISOCYANATES BASED ON HDI

(75) Inventors: Frank Richter, Leverkusen (DE); Beate Baumbach, Leverkusen (DE); Christian Füssel, Tönisvorst (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/014,041

(22) Filed: Dec. 11, 2001

(65) Prior Publication Data

US 2002/0151671 A1 Oct. 17, 2002

(30) Foreign Application Priority Data

Dec. 14, 2000 (DE) .......................... 100 62 411

(51) Int. Cl.$^7$ ................................ C08G 18/80
(52) U.S. Cl. .................... 528/45; 528/73; 544/67; 544/222; 252/182.2; 252/182.21
(58) Field of Search ............... 528/45, 73; 544/67, 544/222; 252/182.2, 182.21

(56) References Cited

U.S. PATENT DOCUMENTS

| | | | |
|---|---|---|---|
| 5,144,031 A | 9/1992 | Pedain | 544/193 |
| 5,914,383 A | 6/1999 | Richter et al. | 528/59 |
| 5,961,878 A | 10/1999 | König et al. | 252/182.21 |
| 6,060,573 A | 5/2000 | König et al. | 528/45 |
| 6,090,939 A | 7/2000 | Richter et al. | 544/67 |
| 6,107,484 A | 8/2000 | Richter et al. | 544/67 |
| 6,191,181 B1 | 2/2001 | Weikard et al. | 522/17.4 |

FOREIGN PATENT DOCUMENTS

EP    0 206 071    12/1986

OTHER PUBLICATIONS

Urethane Chem. Appl., ACS Sypmp. Series #172, ACS Washington, D.C., (month unavailable) 1981, pp. 519–522, Henri Ulrich & Donald S. Gilmore, Novel Masked Aliphatic Diisocyanates.

Proc. XXIVth Fatipec Conference Jun. 8–11$^{th}$, 1998, Interlaken, Switzerland, vol. D. pp. 131–145, F, Richter & H. Mertex, Iminooxadiazindione—vom Nebenprodukt zur Letstruktur in der Polyisocyanatforschung.

Prog. Org. Coatings. vol. 36, (month unavailable) 1999, pp. 148–172, Douglas A. Wicks and Zeno W. Wicks, Jr., Blocked isocyanates III: Part A. Mechanisms and chemistry.

J. Coat. Techn., vol. 67, Mar. 1995, pp. 33–40, Yun Huang, Guobel Chu, Marjorie Nieh, and Frank N. Jones, Aliphatic Isocyanates Blocked with Volatile Alcohols for Decorative Coatings.

Bull Soc. Chim. Belg. vol. 98, (month unavailable) 1989, pp. 19–30, I. De Aguiirre et J. Collot Isocyanates Bloques: Etude Cinetique et Thermodynamique.

*Primary Examiner*—Rachel Gorr
(74) *Attorney, Agent, or Firm*—Joseph C. Gil; Thomas W. Roy

(57) ABSTRACT

The present invention relates to blocked polyisocyanates which are the reaction product of polyisocyanate resins prepared from HDI and containing iminooxadiazinedione groups in an amount of at least 20 mol %, based on the total moles of iminooxadiazinedione and isocyanurate groups, with alcohols of formula (I)

$$ROH \qquad (I),$$

wherein

R represents aliphatic, straight chain or branched, optionally cyclic, optionally substituted (O—$R^1$, $NR^1{}_2$), $C_1$–$C_6$ radicals, preferably $C_1$–$C_4$ radicals, and $R^1$ has the same meaning as R.

The present invention also relates to a process for the preparation of blocked polyisocyanates and to their use for the preparation of polyurethane plastics and coatings, preferably for coating substrates.

9 Claims, No Drawings

BLOCKED POLYISOCYANATES BASED ON HDI

FIELD OF THE INVENTION

The present invention relates to new blocked isocyanates based on 1,6-hexamethylene diisocyanate (HDI) and their preparation and use.

DESCRIPTION OF THE PRIOR ART

The preparation and use of blocked polyisocyanates has been known for a long time. In this procedure the free NCO groups of polyisocyanates are (temporarily) deactivated in order to arrive at products which can preferably be employed in formulations to be processed as one component (cf. D. A. Wicks and Z. W. Wicks Jr., Progr. Org. Coatings, vol. 36, 1999, p. 148 et seq. and literature cited therein). Blocked polyisocyanate hardeners based on polyisocyanates prepared from oligomeric HDI derivatives, for example, trimers (isocyanurates), have been widely introduced.

Alcohols have proved suitable as blocking agents in numerous uses (cf. also Y. Huang, G. Chu, M. Nieh and F. N. Jones, J. Coat. Techn., vol. 67, 1995, p. 33–40 and literature cited therein). However, products based on HDI derivatives are treated only on the margin in the literature reference cited above (cf. loc. cit., p. 37, line 1, this is a methanol-blocked Desmodur® N 3300 from Mobay). The use of specific high-boiling alcohols, such as 1- and 2-octanol (I. de Aguirree and J. Collot, Bull. Soc. Chim. Belg., vol. 98, 1989, 19); furfuryl alcohol (EP-A 206 071), benzyl alcohol (H. Ulrich and D. Gilmore, Urethane Chem. Appl., ACS Symp. Series # 172, ACS Washington D.C., 1981, p. 519); and cyclohexanol (EP-A 21 014) is mentioned more often.

It is a disadvantage in this connection that the blocking of HDI isocyanurate trimers with simple alcohols, such as methanol, ethanol, n-and iso-propanol etc., leads to products which have an unsatisfactory resistance to crystallization in conventional paint solvents, such as n-butyl acetate (BuAc), 2-methoxypropyl acetate (MPA), xylene (X), solvent naphtha (SN 100) etc., at room temperature (22±2° C.). After preparation of the blocked polyisocyanate hardener, a thickening of the solution is observed, sometimes with somewhat of a delay in time, resulting after a few days in complete solidification or in partial gelling of the previously clear, liquid mixture.

The tendency of alcohol-blocked HDI isocyanurate trimers to crystallize intensifies at high concentrations of the alcohol-blocked polyisocyanate in the above-mentioned paint solvents, and when the HDI isocyanurate polyisocyanate contains high contents of the "ideal structure" of the HDI trimer, 2,4,6-tris(6-isocyanatohexyl)-2,4,6-triazine-1,3, 5-trione. This indicates that the reaction products of 2,4,6-tris(6-isocyanatohexyl)-2,4,6-triazine-1,3,5-trione with three equivalents of alcohol have the greatest tendency to crystallize, while an increasing "contamination" of the latter with alcohol-blocked higher molecular weight isocyanurate polyisocyanates (pentamers, heptamers etc.) reduces the tendency of the overall mixture to crystallize. Such effects are often encountered in organic chemistry. However, it is impossible to predict the content down to which the constituents which tend to crystallize must be depleted in order to arrive at products which are stable towards crystallization.

An object of the present invention is to provide HDI polyisocyanates which are blocked with simple alcohols and which have a significantly improved resistance towards crystallization compared with the known HDI isocyanurate polyisocyanates blocked with simple alcohols, while maintaining or improving the other advantageous technology properties of blocked HDI isocyanurate polyisocyanates.

Surprisingly, it has been possible to achieve this object by using HDI polyisocyanates which contain a portion of iminooxadiazinedione groups (asymmetric trimers, AST; HDI-AST polyisocyanates).

SUMMARY OF THE INVENTION

The present invention relates to blocked polyisocyanates which are the reaction product of polyisocyanate resins prepared from HDI and containing iminooxadiazinedione groups in an amount of at least 20 mol %, based on the total moles of iminooxadiazinedione and isocyanurate groups, with alcohols of formula (I)

$$ROH \quad (I),$$

wherein

R represents aliphatic, straight chain or branched, optionally cyclic, optionally substituted (O—$R^1$, $NR^1_2$), $C_1$–$C_6$ radicals, preferably $C_1$–$C_4$ radicals, and $R^1$ has the same meaning as R.

The present invention also relates to a process for the preparation of blocked polyisocyanates by reacting polyisocyanate resins prepared from HDI and containing iminooxadiazinedione groups in an amount of at least 20 mol %, preferably at least 30 mol %, based on the total moles of iminooxadiazinedione and isocyanurate groups, with alcohols of formula (I).

The present invention finally relates to the use of the blocked HDI polyisocyanates according to the invention and containing iminooxadiazinedione groups for the preparation of polyurethane plastics and coatings, preferably for coating substrates.

DETAILED DESCRIPTION OF THE INVENTION

The preparation of HDI-AST polyisocyanates is described, for example, in EP-A 798 299. The use of HDI-AST polyisocyanates for the preparation of blocked polyisocyanates is disclosed in EP-A 947 531, p. 3, l. 23–25. However, EP-A 947 531 provides polyisocyanates which are blocked with malonic esters and are stabilized with formaldehyde against thermal yellowing. Alcohol-blocked polyisocyanates are not dealt with in EP-A 947 531. Furthermore, polyisocyanates which are based exclusively on HDI are not preferred as starting components for the preparation of the blocked polyisocyanate claimed in EP-A 947 531, as mentioned explicitly in loc. cit. p. 3, l. 26–28.

The previous publications of the prior art lack any indication that the combination of "alcohol+HDI-AST polyisocyanates" could lead to products with advantageous properties. The expert cannot deduce generally from the previous publications of the prior art that the resistance of blocked HDI-AST polyisocyanates towards crystallization differs in any manner from their counterparts based purely on isocyanurate (symmetric trimers). Only the generally lower viscosity of AST-PIC compared with their symmetric counterparts is known from the literature (Proc. XXIVth Fatipec Conference, Jun. 8–11, 1998, Interlaken, Switzerland, vol. D. pp. 131–145). There is no "lower viscosity of the non-blocked hardener—better stability of the blocked form to crystallization" connection. It is generally known that with increasing "contamination" of organic substances a lowering in melting point as a rule occurs, but whether and how long such mixtures are stable towards crystallization is completely uncertain and always requires experimental trials in the individual case.

The blocked HDI-AST polyisocyanates according to the invention can be prepared in an industrially simple manner by reaction of the HDI-AST polyisocyanates with alcohols. Pure alcohols or mixtures can be used in this reaction. Suitable alcohols for the blocking reaction are all, optionally substituted (—O—$R^1$, —$NR^1_2$; $R^1$=straight chain or branched $C_1$–$C_4$-alkyl), linear, branched, or cycloaliphatic $C_1$–$C_6$ alcohols. Examples of said alcohols are methanol, ethanol, methoxyethanol (ethylene glycol monomethyl ether), ethoxyethanol (ethylene glycol monoethyl ether), dimethylaminoethanol, diethylaminoethanol, propanol (any isomer), methoxy propanol (any isomer), ethoxy propanol (any isomer), dimethylaminopropanol (any isomer), diethylaminopropanol (any isomer), butanol (any isomer), pentanol (any isomer), and hexanol (any isomer). Preferred alcohols are methanol, ethanol, n- and iso-propanol and methoxypropanol isomers.

It is irrelevant whether or not the alcohols used as the blocking agent are employed in exactly the stoichiometric ratio, based on the free NCO groups of the HDI-AST polyisocyanates. A small excess of alcohol is usually employed: however, a certain deficit of alcohol is also tolerated, since the free NCO groups of the polyisocyanates can react to a small extent beyond the pure NCO—OH reaction in side reactions, e.g. to form allophanates. The NCO—OH molar ratio in the blocking reaction is preferably between 1.2 and 0.8, more preferably between 1.1 and 0.9.

To adapt the properties of the products according to the invention to the particular application requirements (increase in the crosslinking density by increasing the average blocked NCO functionality in the finished hardener, influencing of the elasticity by components which impart hardness/softness etc.), a so-called prelengthening can take place in addition to the blocking reaction. For this, less than the stoichiometric amounts (based on the number of NCO groups in the starting resin) of alcohols, amines and/or amino alcohols are added to the polyisocyanate component containing free isocyanate groups, i.e., the above-mentioned prelengthening agents containing at least 2 OH or NH groups per molecule.

Compounds which are particularly suitable for this are optionally branched diols and triols which optionally contain cycloaliphatic segments and preferably contain an average of 3 to 30 carbon atoms, in which the carbon chain can optionally be interrupted by functional groups, in particular ether and ester groups. Compounds which are preferably employed are $C_3$–$C_{12}$ di- and triols, such as Isomers and mixtures of the following compounds: propanediols, butanediols, pentanediols, hexanediols, heptanediols, octanediols, nonanediols, decanediols and trimethylolethane and -propane. The NCO groups which have not been consumed in the "prelengthening" reaction are subsequently or simultaneously reacted with the actual blocking agent. The amount of NCO groups reacted in the "prelengthening" reaction, based on the total amount of NCO groups of the starting resin, is 1 to 50%, preferably 5 to 20%.

The blocking and also the prelengthening reaction can be accelerated by using known catalysts from polyurethane chemistry. More catalyst than is absolutely necessary to accelerate the NCO—OH reaction to an industrially advantageous level—i.e. as a rule 2 to 24 hours until the absence of free NCO groups in the reaction mixture—can also be employed here, since the reaction of the blocked HDI-AST polyisocyanates according to the invention with polyol components for the preparation of polyurethane plastics and coatings is as a rule also catalyzed.

Examples of suitable catalysts described in D. A. Wicks and Z. W. Wicks Jr., Progr. Org. Coatings, vol. 36, 1999, pp. 148 and literature cited therein. These include tin compounds of the $R_n SnR'_{(4-n)}$ type, in pure form or as any desired mixtures of different species with one another, optionally also with a proportion of tin-free species, wherein R represents identical or different, optionally branched radicals from the $C_1$–$C_{12}$-alkyl series, preferably n-butyl and n-octyl, n represents 1, 2 or 3 and R' represents:
→$C_1$–$C_{20}$ alkanoate, —O—C(O)—R", preferably acetate, 2-ethylhexylhexanoate and laurate, or
→$C_1$–$C_{20}$ thioglycollate, —S—$CH_2$C(O)—OR''', and R'" preferably represents n-butyl and iso-octyl.

The blocked HDI-AST polyisocyanates according to the invention can be employed for a large number of uses. Examples of these are general industrial painting, automobile initial painting ("OEM")—both the filler and the clear coating sector—coating of glass and coil and can coating. The blocked HDI-AST polyisocyanates according to the invention are preferably employed in coil and can coating. In addition to the good stability of the blocked HDI-AST polyisocyanates according to the invention to crystallization, the good results in the T-bend test on metal sheets coated in this way, the very good subsequent tear strength of the metal sheets deformed in the T-bend test after exposure to heat and a very good resistance to over-stoving are other advantages (for details, cf. use examples 9 and 10).

Since the blocked HDI-AST polyisocyanates according to the invention are very highly viscous products in the pure, undiluted form, solvents are preferably added for better handling. To keep the content of volatile organic compounds (VOC) as low as possible, however, it is desirable to choose a solvent content which is as low as possible, but sufficient to establish a low viscosity necessary for good processability. The general property of asymmetric diisocyanate trimers of having a significantly lower viscosity than their symmetric isomers is an additional benefit. As a result the solvent content of blocked HDI-AST polyisocyanates can be reduced for the same viscosity and NCO functionality of the hardener compared with systems based purely on isocyanurate. Lower viscosities for the same solvent content in the paint mixture result.

Possible solvents are those known from the paint industry. Examples include hydrocarbons (preferably aromatic), esters, ketones, ether-esters, alcohols and any mixtures thereof.

The blocked HDI-AST polyisocyanates according to the invention can be combined with known polyols ("binders"). Examples include polyester polyols, polyacrylate polyols, polyurethane polyols, epoxy resins, amino resins (melamine resins, urea resins and benzoguanamine resins) and mixtures thereof. The equivalent ratio of binder to blocked hardener is preferably selected such an equivalent ratio of 1:1 results. However, the product can also be over-crosslinked (blocked NCO:OH>1) and to a certain extent under-crosslinked (blocked NCO:OH<1).

The blocked HDI-AST polyisocyanates according to the invention are suitable for coating a large number of materials, such as glass, concrete and metal. They are preferably employed for painting sheet metals (in so-called "coil" and "can coating").

EXAMPLES

Percentage data always relate to weight, unless stated otherwise.

The dynamic viscosities were determined at 23° C. with a VT 550 viscometer from Haake. By measurements at different shear rates it was ensured that the flow properties of the polyisocyanate mixtures according to the invention and also those of the comparison products correspond to those of ideal Newton liquids. The shear rate therefore did not have to be stated. The residual monomer contents were determined by gas chromatography. Hazen color numbers were determined in accordance with DIN 53 409. The NCO content of the base resins containing free NCO groups described in the examples and comparison examples was determined by titration in accordance with DIN 53 185. The blocked NCO contents of the blocked polyisocyanates described in the examples and comparison examples were calculated on the basis of the latter, assuming that the NCO groups reacted in the course of the blocking reaction were all available during the curing reaction of the blocked polyisocyanate. IR spectroscopy analyses were prepared on an FT-IR apparatus PE 1750 from Perkin-Elmer on layers of the undiluted reaction mixtures approx. 0.1 mm thick between NaCl windows. The blocking reaction was complete when the intensity of the band for the $v_{NCO}$ vibration at approx. 2200 to 2300 cm$^{-1}$ could not be distinguished from the noise level. Mol % data were determined by $^{13}$C-NMR spectroscopy (cf. Proc. XXIVth Fatipec Conference, Jun. 8–11, 1998, Interlaken, Switzerland, vol. D, pp. 131–145). They were always based on the sum of the NCO trimer structures (iminooxadiazinedione and isocyanurate groups). The measurements were made on the DPX 400 apparatus from Brucker on approx. 50% samples in dry CDCl$_3$ at a frequency of 100 MHz. The chem. shift of the solvent (77.0 ppm) was used as the reference for the ppm scale. Data on the chemical shift of isocyanurates can be found in the literature (cf. D. Wendisch, H. Reiff and D. Dieterich, Die Angewandte Makromolekulare Chemie 141, 1986, 173–183 and lit. cited therein), or can be obtained by measuring model substances. The 3,5-dimethyl-2-methylimino-4,6-diketo-1,3,5-oxadiazine (AST of methyl isocyanate), obtained by the method of Slotta and Tschesche, *Chem. Ber.* 1927, 60, 295, had the following $^{13}$C-NMR chem. shifts (in ppm): 148.3; 144.6 and 137.3 ($\underline{C}$=O/$\underline{C}$=N atoms of the iminooxadiazinedione ring). The iminooxadiazinedione groups of the blocked HDI-AST polyisocyanates according to the invention and their base resins containing NCO groups had very similar $^{13}$C-NMR chem. shifts of the $\underline{C}$=O/$\underline{C}$=N atoms and were distinguished as such from other isocyanate secondary products.

Example 1 (Preparation of HDI-AST Polyisocyanates, "Base Resins")

4,000 g (23.8 mol) of hexamethylene diisocyanate (HDI) were initially heated to 60° C. in a 6 liter four-necked stirred apparatus with a reflux condenser, metering device for the catalyst, internal thermometer and gas inlet, and freed from dissolved gases by stirring under 20 mbar for one hour. The apparatus was then flushed with nitrogen and the asymmetric trimerization was started, while stirring and passing through a slow stream of nitrogen, by adding in portions an approx. 50% solution of tetrabutylphosphonium hydrogen difluoride, n-Bu$_4$P$^+$[HF$_2$]$^-$ in iso-propanol/methanol (approx. 2:1) (increase in temperature of 1–2 K.). The progress of the reaction was monitored under n$_D$ control (n$_{D(start)}$=n$_{D(HDI)}$=1.4523 at 20° C.). The reaction was conducted up to the desired conversion as determined by the refractive index of the crude product, n$_D^{20}$(stop), by occasional addition of further catalyst and was then stopped by addition of 0.48 g of a 60% solution of p-toluenesulphonic acid in iso-propanol, depending upon the g of the above-mentioned catalyst solution employed (cf. table 1).

The crude product was worked up by thin film distillation in a thin film laboratory evaporator, molecular evaporator type, under a vacuum of approx. 0.2 mbar and at a temperature of the heating medium in the pre-evaporator and main evaporator of 130 and 150° C., respectively. The resulting products had a residual content of HDI of less than 0.15% and a Hazen color number below 50 APHA. After a short storage time (accelerated at 50° C.), a brightening to up to 50% of the color level measured immediately after the distillation was observed.

TABLE 1

Information on the preparation and data of the HDI-AST polyisocyanates

| | | | Resin data | |
|---|---|---|---|---|
| Example | Catalyst consumption[1] [g] | n$_D^{20}$(stop) | Viscosity [mPas]$^{23°\,C.}$ | NCO content [%] |
| 1a | 2.4 | 1.4600 | 650 | 23.7 |
| 1b | 2.5 | 1.4660 | 1,030 | 23.2 |
| 1c | 4.8 | 1.4760 | 2,500 | 21.8 |

[1]50% solution of n-Bu$_4$P$^+$ [HF$_2$]$^-$ in iso-propanol/methanol (approx. 2:1)

The molar content of iminooxadiazinedione groups, based on the total of isocyanurate and iminooxadiazinedione groups, in the resins obtained according to ex. 1a–c was 40–50 mol %.

Example 2 (Comparison Example)

In each case to a solution, heated to 40° C., of
a) 33 mg (0.16 mmol "Sn") Fascat 4100 (product from Elf Atochem),
b) 100 mg (0.16 mmol "Sn") Desmorapid Z (product from Bayer AG) or
c) 100 mg (0.1 mmol "Sn") Schwedstab OTO 133 (product from AWL Scandinavia AB)

in 51.1 g ethanol (product from Aldrich, denatured with 2% toluene, 1.09 mol "OH"), a solution of 200 g (1.07 mol "NCO") of an HDI isocyanurate polyisocyanate [NCO content of 22.9%, viscosity of 1,200 mPas at 23° C., obtained in accordance with DE-A 38 06 276, example 11, with the difference that the catalyst used for the preparation of the HDI polyisocyanate was employed as a solution not in 2-ethyl-1,3-hexanediol but in 2-ethylhexanol], in 66.7 g solvent naphtha 100 (product from Aral) as added dropwise, while stirring and occasionally cooling externally with an ice-water mixture, such that the internal temperature of the mixture did not exceed 45° C. When the addition of the polyisocyanate solution was complete, stirring was continued at 40° C., with occasional NCO control by IR spectroscopy, until the NCO band was no longer visible (subsequent stirring time of a maximum of 16 hours).

The blocked HDI polyisocyanates (comparison resins) obtained had in addition to a calculated blocked NCO content of 14.4%, the following data immediately after preparation:
a) viscosity: 2,950 mPas/23° C., color number: 11 Apha
b) viscosity: 2,970 mPas/23° C., color number: 14 Apha
c) viscosity: 3,020 mPas/23° C., color number: 17 Apha.

After storage of the mixtures in glass bottles at room temperature (22±2° C.) for several days, all 3 products solidified to a white, semi-crystalline mass. Heating the bottles at 50° C. in a drying cabinet for 12 h gave no improvement to the result. The products were unsuitable for use as blocked polyisocyanate hardeners.

d) A solution of 200 g (1.04 mol "NCO") of an HDI isocyanurate polyisocyanate [NCO content 21.8%, viscosity 3,500 mPas at 23° C., obtained in accordance with DE-A 38 06 276, example 4] in 84.8 g solvent naphtha 100 (product from Aral) was added dropwise all at once to 55.2 g of ethanol (product from Aldrich, denatured with 2% toluene, 1.17 mol "OH") at 50° C. while stirring. When the addition of the polyisocyanate solution was complete, stirring was continued at 100° C. with occasional NCO control by IR spectroscopy until the NCO band was no longer visible (after-stirring time of approx. 6 hours).

Immediately after the preparation, the blocked HDI polyisocyanates (comparison resin) obtained had a calculated blocked NCO content of 12.8%, a viscosity of 1,440 mPas/23° C. and a color number of 20 Apha.

After storage in a glass bottle at room temperature (22±2° C.) for 20 days, gelatinous gel bodies were increasingly formed in the solution. After a further 2 months the product partly solidified to a viscous, gelatinous mass that did not become completely homogeneous again even after heating at 50° C. (12 h) in a drying cabinet. The product was not suitable for use as a blocked polyisocyanate hardener.

Example 3 (According to the Invention)

The procedure was as described in examples 2a–c, with the difference that the catalyst solution in ethanol was preheated only to 30° C. before the start of the addition of the resin solution and that in each case 200 g (1.13 mol "NCO") of the product obtained according to ex. 1a were used as the HDI-AST polyisocyanate. The amount of alcohol was adjusted accordingly (1.15 mol "OH", 54.11 g EtOH denatured with 2% toluene). The reaction was carried out under precise temperature control at <40° C. The reaction times were analogous to those stated in examples 2a–c.

The blocked HDI polyisocyanates according to the invention obtained had in addition to a calculated blocked NCO content of 14.8%, the following data:
a) viscosity: 2,100 mPas/23° C., color number: 9 Apha
b) viscosity: 2,140 mPas/23° C., color number: 14 Apha
c) viscosity: 2,180 mPas/23° C., color number: 13 Apha.

Even after storage at room temperature (22±2° C.) for 3 months, all 3 products remained completely unchanged in viscosity and color number.

Example 4 (According to the Invention)

The procedure was as described in example 3, with the difference that in each case 200 g (1.1 mol "NCO") of the product obtained according to ex. 1b were used as the HDI-AST polyisocyanate. The amount of alcohol was adjusted accordingly (1.12 mol "OH", 52.9 g EtOH denatured with 2% toluene).

The blocked HDI polyisocyanates according to the invention obtained had, in addition to a calculated blocked NCO content of 14.5%, the following data:
a) viscosity: 2,700 mPas/23° C., color number: 9 Apha
b) viscosity: 2,670 mPas/23° C., color number 13 Apha
c) viscosity: 2,580 mPas/23° C., color number: 11 Apha.

Even after storage at room temperature (22±2° C.) for 3 months, all 3 products remained completely unchanged in viscosity and color number.

Example 5 (According to the Invention)

The procedure was as described in example 3, with the difference that in each case 200 g (1.04 mol "NCO") of the product obtained according to ex. 1c were used as the HDI-AST polyisocyanate. The amount of alcohol was adjusted accordingly (1.06 mol "OH", 49.8 g EtOH denatured with 2% toluene).

The blocked HDI polyisocyanates according to the invention obtained had in addition to a calculated blocked NCO content of 13.8%, the following data:
a) viscosity: 3,900 mPas/23° C., color number: 9 Apha
b) viscosity: 3,740 mPas/23° C., color number: 8 Apha
c) viscosity: 3,820 mPas/23° C., color number: 9 Apha.

Even after storage at room temperature (22±2° C.) for 3 months, all 3 products remained completely unchanged in viscosity and color number.

Example 6

A solution of 296 g (1.63 mol "NCO") of an HDI-AST polyisocyanate according to ex. 1b in 108 g butyl acetate (product from Aldrich) was added dropwise to a solution of 80 mg (0.23 mmol "Sn") of dibutyltin diacetate (product from Aldrich) in 150 g of 1-methoxy-2-propanol (product from Aldrich, 1.66 mol "OH") at room temperature, while stirring and occasionally cooling externally with an ice-water mixture, such that the internal temperature did not exceed 30° C. When the addition was complete, the mixture was subsequently stirred at 30° C. until the NCO band was no longer visible by IR spectroscopy (approx. 8 hours). The resulting blocked HDI polyisocyanate according to the invention had a calculated blocked NCO content of 12.4%, a viscosity of 1,280 mPas/23° C. and a color number of 9 Apha.

Even after storage at room temperature (22±2° C.) for 3 months, the product remained completely unchanged in viscosity and color number.

Example 7

A solution of 128 g (0.71 mol "NCO") of an HDI-AST polyisocyanate according to ex. 1b in 42 g butyl acetate (product from Aldrich) was added dropwise to a solution of 36 mg (0.1 mmol "Sn") of dibutyltin diacetate (product from Aldrich) in a mixture of 30 g of ethanol (product from Aldrich, denatured with 2% toluene, 0.64 mol "OH") and 10.2 g of 2,2,4-trimethyl-1,3-pentanediol (TMPD, product from Fluka, 0.14 mol "OH") at room temperature, while stirring and occasionally cooling externally with an ice-water mixture, such that the internal temperature did not exceed 38° C. When the addition was complete, the mixture was subsequently stirred at 30° C. until the NCO band was no longer visible by IR spectroscopy (approx. 8 hours). The resulting blocked HDI polyisocyanates according to the invention had a calculated blocked NCO content of 11.6% (it was assumed that only the portion of NCO groups blocked by EtOH was available for crosslinking after deblocking), a viscosity of 2,350 mPas/23° C. and a color number of 11 Apha.

Even after storage at room temperature (22±2° C.) for 3 months, the product remained completely unchanged in viscosity and color number.

8a: Comparison Example, 8b According to the Invention

In each case to a solution of 333 mg (0.53 mmol "Sn") of Desmorapid Z (product from Bayer AG) in 177 g (2.95 mol "OH") iso-propanol (product from Aldrich), was rapidly added dropwise at room temperature (22±2° C.), while stirring, a solution of a) 506 g (2.76 mol "NCO") of an HDI polyisocyanates of the isocyanurate type with an NCO content of 22.9% and a viscosity of 1,200 mPas at 23° C., obtained according to DE-A 38 06 276, example 11, with the difference that the catalyst used for the preparation of the HDI polyisocyanates was employed as a solution not in 2-ethyl-1,3-hexanediol but in 2-ethylhexanol, or b) 500 g (2.76 mol "NCO") of an HDI-AST polyisocyanate obtained according to example 1b in 285 g MPA (product from Aldrich).

A milky emulsion was initially formed. The internal temperature rose only insignificantly during the addition. The mixture was then stirred at 60° C. for 24 h and thereafter at 100° C. for a further 24 h, until NCO was no longer detected by IR spectroscopy.

While the product obtained according to comparison example 8a solidified to a hard, white mass after a few days, the product prepared according to the invention in accordance with example 8b remained homogeneous, clear and liquid even after storage at room temperature (22±2° C.) for 4 months.

Example 9: Use Example

The preparation of coil coating white paints using various blocked NCO hardeners is described; ex. 9a and 9b are comparison examples, ex. 9c–9k are according to the invention.

Data on the paint preparation is set forth in table 2. This preparation, with the exception of the particular catalyst concentration, is based on recommended recipe RR 6830 of Bayer AG (ex. 9a). The white paints were formulated by mixing an initially prepared ground mixture of the components listed in table 2, lines 3–5 with the components used in the particular experiment, which are listed further below in table 2. All the paints were adjusted to about the same solids content. The recipes according to the invention of ex. 9c–9k have a significantly lower viscosity as determined by a shorter flow time in the DIN 4 cup (less than 120 sec) than comparison recipes 9a and 9b (flow time in the DIN 4 cup about 120 sec).

The results of paint investigations under coil coating conditions on the paints listed in table 2 are summarized in table 3. For this, the particular paint mixture was knife-coated onto chromated aluminium sheets 1 mm thick (dry layer thickness cf. table 3). Immediately after application of the paint, the sheets were stoved on a turntable in an Aalborg oven. As regards "peak metal temperature" (PMT, object temperature) etc., cf. table 3. As can be seen, the products according to the invention have, in addition to the general advantage of stability towards crystallization, a further advantage in the paint film applied on the basis of the lower thermal yellowing. This manifests itself in particular when the paint film was over-stoved at a PMT above 254° C.

Example 10: Use Example

Coil coating white paints using various blocked NCO hardeners were prepared using the recipe from ex. 9a, with the difference that the nature and amount of the catalyst used for the curing were varied and stoving was carried out at various temperatures. Ex. 10a, b, d, f and h are comparison examples; ex. 10c, e, g and i are according to the invention.

As can be seen from the results listed in table 4, if an alcohol-blocked polyisocyanate was used, higher catalyst concentrations were necessary than for an HDI isocyanurate trimer blocked with butanone oxime (Desmodur BL 3175 from Bayer AG). Advantages result when the blocked HDI-AST polyisocyanates according to the invention were used compared with the alcohol-blocked HDI isocyanurate polyisocyanates and also compared with the above-mentioned butanone oxime-blocked system. This was evident from the considerably better resistance to over-stoving and the somewhat higher reactivity detectable from the surface, which was completely stable to 100 double rubs with methyl ethyl ketone, compared with the comparison products, which easily dissolved even though they cured under analogous conditions (matt surface).

TABLE 2

Recipes of the paints compared in example 9

| Ground mixture | Solids or active compound content [%] | Manufacturer | 9a | 9b | 9c | 9d | 9e | 9f | 9g | 9h | 9i | 9j | 9k |
|---|---|---|---|---|---|---|---|---|---|---|---|---|---|
| Alkynol ® 1665 | 65 | 1 | 9.50 | 9.66 | 9.66 | 9.66 | 9.66 | 9.66 | 9.66 | 9.66 | 9.66 | 9.66 | 9.66 |
| Kronostitan ® 2160 | 100 | 2 | 28.60 | 28.99 | 28.99 | 28.99 | 28.99 | 28.99 | 28.99 | 28.99 | 28.99 | 28.99 | 28.99 |
| Solvesso 200S | — | 3 | 8.10 | 7.73 | 7.73 | 7.73 | 7.73 | 7.73 | 7.73 | 7.73 | 7.73 | 7.73 | 7.73 |
| Paint constituents | | | | | | | | | | | | | |
| Alkynol ® 1665 | 65 | 1 | 21.2 | 22.33 | 23.39 | 23.39 | 23.39 | 23.21 | 23.21 | 23.21 | 22.78 | 22.78 | 22.78 |
| Desmodur ® BL 3175 | 75 | 1 | 11.50 | | | | | | | | | | |
| Resin from ex. 2d | 75 | — | | 10.92 | | | | | | | | | |
| Resin from ex. 3a | 80 | — | | | 9.38 | | | | | | | | |
| Resin from ex. 3b | 80 | — | | | | 9.38 | | | | | | | |
| Resin from ex. 3c | 80 | — | | | | | 9.38 | | | | | | |
| Resin from ex. 4a | 80 | — | | | | | | 9.52 | | | | | |
| Resin from ex. 4b | 80 | — | | | | | | | 9.52 | | | | |
| Resin from ex. 4c | 80 | — | | | | | | | | 9.52 | | | |
| Resin from ex. 5a | 80 | — | | | | | | | | | 9.87 | | |
| Resin from ex. 5b | 80 | — | | | | | | | | | | 9.87 | |
| Resin from ex. 5c | 80 | — | | | | | | | | | | | 9.87 |
| Acronal ® 4F | 50 | 4 | 1.40 | 1.45 | 1.45 | 1.45 | 1.45 | 1.45 | 1.45 | 1.45 | 1.45 | 1.45 | 1.45 |
| CAB 531-1 | 10 | 5 | 7.00 | 7.25 | 7.25 | 7.25 | 7.25 | 7.25 | 7.25 | 7.25 | 7.25 | 7.25 | 7.25 |
| Schwedstab OTO-133 | 10 | 6 | 0.80 | 5.80 | 5.80 | 5.80 | 5.80 | 5.80 | 5.80 | 5.80 | 5.80 | 5.80 | 5.80 |

TABLE 2-continued

Recipes of the paints compared in example 9

|  | Solids or active compound content [%] | Manufacturer | Example no. | | | | | | | | | | |
|---|---|---|---|---|---|---|---|---|---|---|---|---|---|
| Ground mixture | | | 9a | 9b | 9c | 9d | 9e | 9f | 9g | 9h | 9i | 9j | 9k |
| Solvesso 200S | — | 3 | 11.90 | 5.88 | 6.36 | 6.36 | 6.36 | 6.40 | 6.40 | 6.40 | 6.48 | 6.48 | 6.48 |
| Total [contents by weight] | | | 100.0 | 100.0 | 100.0 | 100.0 | 100.0 | 100.0 | 100.0 | 100.0 | 100.0 | 100.0 | 100.0 |
| of this (binder + hardener) [%] | | | 28.6 | 29.0 | 29.0 | 29.0 | 29.0 | 29.0 | 29.0 | 29.0 | 29.0 | 29.0 | 29.0 |

Manufacturers' code and details of the products employed
1 Bayer AG
Alkynol ® 1665 is an oil-free saturated polyester (65% solution in solvent naphta 100/isobutanol 31.5:3.5) with an OH content of 1.7% in the delivery form.
Desmodur ® BL 3175 is an HDI polyisocyanates blocked with butanone oxime (75% solution in solvent naphtha 100) with a blocked NCO content of approx. 11.1% a viscosity of 3,700 ± 400 mPas at 23° C. in the delivery form.
2 Kronos International, white pigment (titanium dioxide)
3 Exxon/Esso GmbH, solvent (mixture of aromatics)
4 BASF AG, defoamer
5 Krahn Chemie GmbH, flow control agent
6 AWL Scandinavia AB, catalyst, comprising: approx. 45% monooctyltin tris(isooctylthioglycollate), approx. 40% dioctyltin bis(isooctylthioglycollate), approx. 4% mon tris(isooctylthioglycollate) and approx. 1% bisphenol A

TABLE 3

Results of the tests under coil coating conditions

| Example no.: | | 9a | 9b | 9c | 9d | 9e | 9f | 9g | 9h | 9i | 9j | 9k |
|---|---|---|---|---|---|---|---|---|---|---|---|---|
| PMT | | 232° C. | 232° C. | 232° C. | 232° C. | 232° C. | 232° C. | 232° C. | 232° C. | 232° C. | 232° C. | 232° C. |
| Layer thickness μm | (ECCA-T1)* | 20.21 | 20.22 | 20.21 | 20.22 | 20.21 | 20.22 | 20.22 | 20.22 | 20.22 | 20.21 | 20.22 |
| Gardner gloss 20°/60° | (ECCA-T2)* | 63/86 | 74/88 | 63/86 | 74/88 | 73/85 | 73/85 | 73/85 | 73/85 | 73/85 | 73/85 | 73/85 |
| Berger white value | PMT 232° C. | 93.7 | 95.7 | 96.7 | 96.0 | 96.1 | 96.7 | 96.6 | 96.5 | 96.2 | 96.8 | 96.8 |
| Yellow value | PMT 232° C. | −4.1 | −3.9 | −4.0 | −3.9 | −3.9 | −4.0 | −4.1 | −4.1 | −4.1 | −4.1 | −4.2 |
| Berger white value | PMT 254° C. | 93.4 | 95.2 | 94.7 | 94.8 | 94.9 | 95.4 | 94.5 | 94.9 | 94.5 | 95.4 | 94.5 |
| Yellow value | PMT 254° C. | −4.0 | −4.0 | −3.6 | −2.9 | −3.6 | −3.7 | −3.4 | −3.6 | −3.2 | −3.8 | −2.7 |
| MEK wiping test Dh. 2 kg | PMT 232° C. | 100 | 100 S | 100 S | 100 S | 100 S | 100 S | 100 S | 100 S | 100 S | 100 S | 100 S |
| | PMT 224° C. | 100 S | 10 | 10 | 10 | 10 | 10 | 10 | 10 | 10 | 10 | 10 |
| | PMT 216° C. | 100 MW | <5 | <5 | <5 | <5 | <5 | <5 | <5 | <5 | <5 | <5 |
| Microhardness 30 s 10 g/30 s | | 3.9/3.0 | 7.5/6.3 | 7.8/6.9 | 6.9/6.1 | 7.7/7.2 | 8.5/7.6 | 7.2/6.5 | 7.4/6.8 | 6.5/6.0 | 7.5/6.5 | 6.4/5.3 |
| Impact test inch/lb | (ECCA-T5)* | 80 | 80 | 80 | 80 | 80 | 80 | 80 | 80 | 80 | 80 | 80 |
| Adhesion 6 mm in # | (ECCA-T6)* | 0 | 0 | 0 | 0 | 0 | 0 | 0 | 0 | 0 | 0 | 0 |
| T-bend test adhesion o.B. | (ECCA-T7)* | 1.0 T | 1.0 T | 0.5 T | 0.5 T | 0.5 T | 1.0 T | 0 T | 0 T | 0.5 T | 0 T | 0 T |
| T-bend elasticity o.B. | (ECCA-T7)* | 1.0 T | 0.5 T | 0.5 T | 0.5 T | 0.5 T | 1.0 T | 0.5 T | 0 T | 0.5 T | 0.5 T | 0.5 T |
| T-bend test | 30'100° C. | 1.5 T | 1.5 T | 1.5 T | 1.5 T | 1.5 T | 1.0 T | 1.5 T | 1.0 T | 1.5 T | 1.5 T | 1.5 T |
| subsequent tear strength | | o.k. | o.k. | o.k. | o.k. | o.k. | o.k. | o.k. | o.k. | o.k. | o.k. | o.k. |

Recipes cf. table 2
MEK wiping test: ECCA test method T 11, MEK — methyl ethyl ketone (butanone, Shell/Exxon), M = matt; S = soft
* = in accordance with ECCA test methods.
Substrate: Aluminium 1 mm, pretreated with Bonder 722

TABLE 4

Results of the investigations of the resistance to over-stoving and the reactivity using various crosslinking catalysts

| Example | 10a | 10b | 10c | 10d | 10e | 10f | 10g | 10h | 10i |
|---|---|---|---|---|---|---|---|---|---|
| blocked NCO hardener | Desmodur ® BL 3175 | from ex. 2d | from ex. 4c | from ex. 2d | from ex. 4c | from ex. 2d | from ex. 4c | from ex. 2d | from ex. 4c |
| Catalyst[1)] | 0.3% | 2.0% | 2.0% | 1.0% | 1.0% | 2.0% | 2.0% | 3.0% | 3.0% |
| | | | | Resistance to over-stoving | | | | | |
| Whiteness PMT 232° C. | 93.8 | 93.3 | 95.2 | 93.6 | 95.3 | 92.7 | 94.0 | 93.6 | 93.9 |
| Whiteness PMT ≧254° C. | 91.3 | 91.8 | 94.3 | 93.2 | 93.8 | 92.4 | 93.6 | 90.2 | 92.8 |
| | | | | Reactivity | | | | | |
| | | | | PMT 210° C. | | | | | |
| MEK wiping test Dh. 2 kg | 100 MS | | | | | 100 S | 100 S | 100 S | 100 S |
| | | | | PMT 216° C. | | | | | |
| MEK wiping test Dh. 2 kg | 100 S | 5 | | 10 | | 100 S | 100 S | 100 S | 100 S |

TABLE 4-continued

Results of the investigations of the resistance to over-stoving and the reactivity using various crosslinking catalysts

| Example | 10a | 10b | 10c | 10d | 10e | 10f | 10g | 10h | 10i |
|---|---|---|---|---|---|---|---|---|---|
| | | | | PMT 224° C. | | | | | |
| MEK wiping test Dh. 2 kg | 100 | 100 MS | 30 | 100 S | 25 | 100 S | 100 | 100 S | 100 S |
| | | | | PMT 232° C. | | | | | |
| MEK wiping test Dh. 2 kg | 100 | 100 MS | 100 | 100 S | 100 | 100 | 100 | 100 S | 100 |

[1] The amount of catalyst was always based on the sum of solids in the binder and in the blocked polyisocyanate hardener.
DBTL = dibutyltin dilaurate (Desmorapid ® Z, Bayer),
DBTDA = dibutyltin diacetate (Aldrich)
Alkynol ® 1665 in a blocked NCO:OH ratio of 1:1 was always employed as the binder
MEK wiping test: ECCA test method T 11, MEK = methyl ethyl ketone (butanone, Shell/Exxon), M = matt; S = soft
Substrate: Aluminium 1 mm; Bonder 722

Although the invention has been described in detail in the foregoing for the purpose of illustration, it was to be understood that such detail was solely for that purpose and that variations can be made therein by those skilled in the art without departing from the spirit and scope of the invention except as it may be limited by the claims.

What is claimed is:

1. A blocked polyisocyanate which comprises the reaction product of an iminooxadiazinedione and isocyanurate groups containing polyisocyanate resin prepared from HDI (hexamethylene diisocyanate) containing iminooxadiazinedione groups in an amount of at least 20 mol %, based on the total moles of iminooxadiazinedione and isocyanurate groups, with an alcohol of formula (I)

$$ROH \qquad (I),$$

wherein

R represents an optionally substituted (O—$R^1$, $NR^1_2$) straight chain, branched or cyclic aliphatic $C_1$–$C_6$ radical and $R^1$ can be straight chain or branched $C_1$–$C_4$ alkyl.

2. The blocked polyisocyanate of claim 1 wherein R represents an aliphatic, straight chain or branched, optionally substituted (O—$R^1$, $NR^1_2$), $C_1$–$C_4$ radical and $R^1$ represents an aliphatic, straight chain or branched $C_1$ to $C_4$ radical.

3. The blocked polyisocyanate of claim 1 wherein the alcohol comprises methanol, ethanol, n- or iso-propanol or a methoxypropanol isomer.

4. The blocked polyisocyanate of claim 1 wherein the polyisocyanate resin contains iminooxadiazinedione groups in an amount of at least 30 mol %, based on the total moles of iminooxadiazinedione and isocyanurate groups.

5. The blocked polyisocyanate of claim 2 wherein the polyisocyanate resin contains iminooxadiazinedione groups in an amount of at least 30 mol %, based on the total moles of iminooxadiazinedione and isocyanurate groups.

6. The blocked polyisocyanate of claim 3 wherein the polyisocyanate resin contains iminooxadiazine-dione groups in an amount of at least 30 mol %, based on the total moles of iminooxadiazinedione and isocyanurate groups.

7. A process for the preparation of a blocked polyisocyanate which comprises reacting a polyisocyanate resin prepared from HDI (hexamethylene diisocyanate) and containing iminooxadiazinedione groups in an amount of at least 20 mol %, based on the total moles of iminooxadiazinedione and isocyanurate groups, with an alcohol of formula (I)

$$ROH \qquad (I),$$

wherein

R represents aliphatic, straight chain or branched, optionally cyclic, optionally substituted (O—$R^1$, $NR^1_2$), $C_1$–$C_6$ radicals and $R^1$ has the same meaning as R.

8. A polyurethane plastic or coating prepared from a composition containing the blocked polyisocyanate of claim 1.

9. A metallic substrate coated with a coating composition containing the blocked polyisocyanate of claim 1.

* * * * *